United States Patent

Leadbetter et al.

[11] Patent Number: 5,324,597
[45] Date of Patent: Jun. 28, 1994

[54] THERMAL SHUNT FOR A BATTERY

[75] Inventors: Alan Leadbetter, Widnes; Michael F. Mangan, Bolton; John Molyneux, Runcorn, all of United Kingdom

[73] Assignee: Silent Power GmbH fur Energiespeichertechnik, Essen, Fed. Rep. of Germany

[21] Appl. No.: 941,134

[22] PCT Filed: May 16, 1991

[86] PCT No.: PCT/GB91/00772
§ 371 Date: Nov. 12, 1992
§ 102(e) Date: Nov. 12, 1992

[87] PCT Pub. No.: WO91/18426
PCT Pub. Date: Nov. 28, 1991

[30] Foreign Application Priority Data

May 16, 1990 [GB] United Kingdom ............ 9010948

[51] Int. Cl.⁵ ...................................... H01M 10/50
[52] U.S. Cl. .................................. 429/62; 429/120
[58] Field of Search .............................. 429/62, 120

[56] References Cited

U.S. PATENT DOCUMENTS

| | | | |
|---|---|---|---|
| 3,837,918 | 9/1974 | Nakabayashi | 429/120 X |
| 3,865,630 | 2/1975 | Reimers | |
| 4,042,757 | 8/1977 | Jones | 429/104 |
| 4,138,692 | 2/1979 | Meeker et al. | 357/82 |
| 4,207,386 | 6/1980 | Meinhold | 429/62 |
| 4,314,008 | 2/1982 | Blake | 429/8 |
| 4,329,407 | 5/1982 | Gross et al. | 429/101 |
| 4,376,809 | 3/1983 | Bindin | 429/62 |
| 4,443,525 | 4/1984 | Hasenauer | 429/120 X |
| 4,517,263 | 5/1985 | Reiss et al. | 429/120 |

FOREIGN PATENT DOCUMENTS

| | | |
|---|---|---|
| 0001123A1 | 3/1979 | European Pat. Off. |
| 2819026 | 11/1979 | Fed. Rep. of Germany |
| 2819027 | 11/1979 | Fed. Rep. of Germany |
| 2819600A1 | 11/1979 | Fed. Rep. of Germany |
| 2474195 | 7/1981 | France |
| 62-216349(A) | 9/1987 | Japan |
| 63-175355(A) | 7/1988 | Japan |
| 2020087A | 11/1979 | United Kingdom |
| 2020088A | 11/1979 | United Kingdom |
| 2060984A | 5/1981 | United Kingdom |
| 2070975A | 9/1981 | United Kingdom |

Primary Examiner—Stephen Kalafut
Attorney, Agent, or Firm—Finnegan, Henderson, Farabow, Garrett & Dunner

[57] ABSTRACT

A thermal shunt is provided for a battery contained in a thermally insulated container. The thermal shunt comprises an external heat sink, a heat conducting fluid, and a pump fluid which urges the heat conducting fluid into thermal contact with battery.

8 Claims, 3 Drawing Sheets

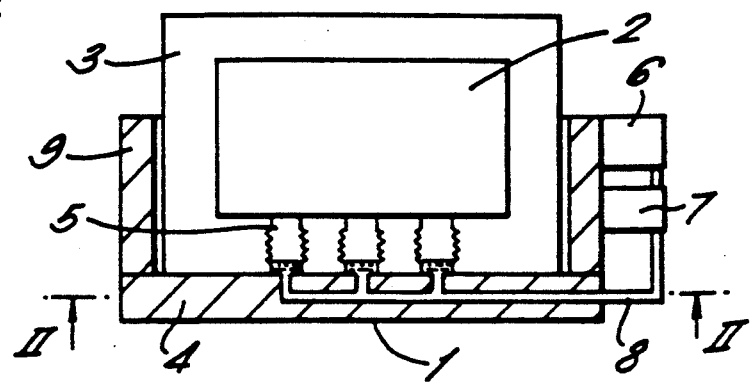
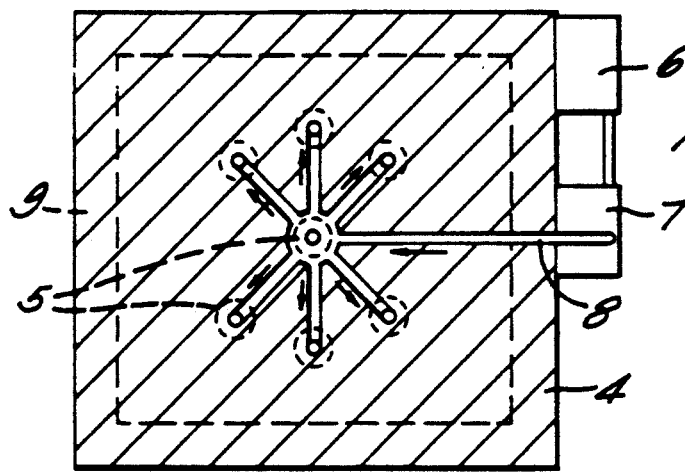
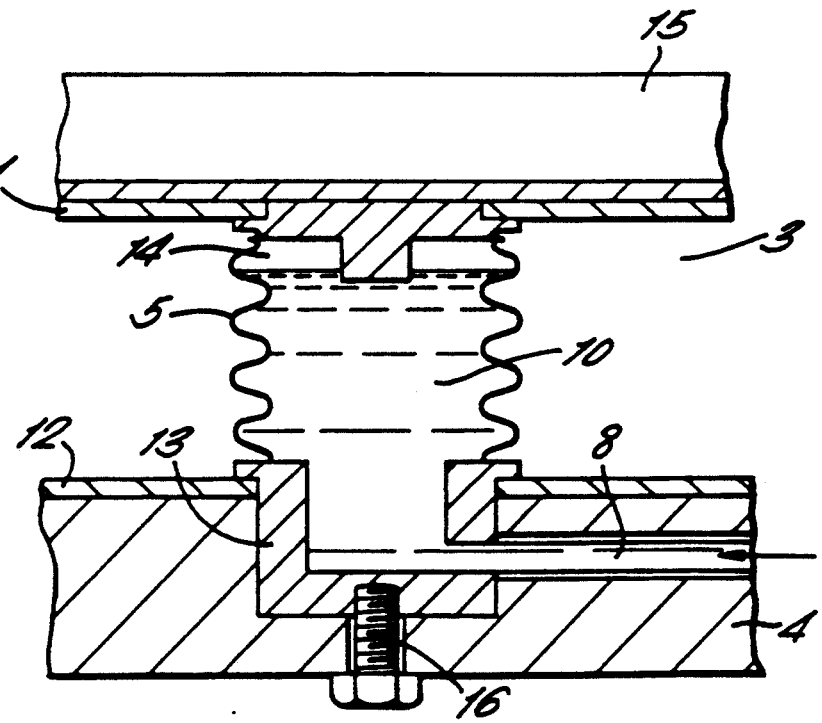

THERMAL SHUNT FOR A BATTERY

The present invention concerns a thermal shunt for a battery, in particular, a battery which must be thermally insulated to retain heat, such as a battery made up of cells having a solid electrolyte and electrodes of molten materials.

A typical example of such a cell is a sodium sulphur cell which will employ liquid sodium as the anode and liquid sulphur as the cathode, the two being separated by a solid electrolyte of beta alumina which is electronically insulating but conductive to cations of the alkali metal.

A battery will comprise several of the cells connected together within a thermally-insulated container or battery box. Because the electrochemical reaction will only proceed efficiently at elevated temperatures, the typical operating temperature is about 350° C.

During charging and discharging of the cells, heat is generated due to internal resistances, for example, and builds up within the battery box. Although some of this internal heat energy is offset to some extent by the slow natural cooling of the battery, this cooling is not sufficient to keep the temperature at the desired operating value, especially in cases where the insulation of the battery box is particularly efficient or the duty particularly arduous.

Since increases in temperature are undesirable and if allowed to proceed too far will lead to overheating of the battery which could result in damage, ways have been considered of providing means whereby heat is allowed to be conducted out through the insulating battery container.

Accordingly, the present invention provides a thermal shunt for a battery contained in a thermally-insulating container comprising an external heat sink and means, connected between the heat sink and the battery, which at a predetermined temperature are actuated to conduct heat from the battery to the heat sink, thereby increasing the heat loss from the battery.

Preferably, the means connecting the heat sink to the battery is a thermally conductive fluid which makes thermal contact with both the battery and heat sink only when the predetermined temperature is reached.

Preferably, the thermal shunt further comprises a pump which at the predetermined temperature urges the thermally conductive fluid to make a thermal contact between one or more selected points on the battery surface and heat sink.

Preferably, the pump supplies fluid to one or more containers connected between the battery and the heat sink.

Preferably, the containers are bellows.

Preferably, the thermal shunt is arranged on the lower surface of the battery.

In a second embodiment of the present invention the thermal shunt further comprises a pump which supplies pressurised gas or vapour to one or more containers holding the thermally conductive fluid.

Preferably, the container or containers for the fluid is a concentric bellows arrangement, the gas or vapour being delivered to the bellows arrangement to urge the fluid to make thermal contact between the battery and the heat sink.

Preferably, the gas or vapour is delivered to the inner bellows and the fluid is urged between the inner and outer bellows to make thermal contact between the battery and heat sink.

Preferably, the thermal shunt is arranged on the upper surface of the battery.

In a third embodiment of the present invention the means connecting the battery to the heat sink is one or more partially filled containers of liquid located between the heat sink and battery, the liquid being maintained at a given pressure such that it will boil at the predetermined temperature to release vapour which will condense in the vicinity of the heat sink to effect heat conduction from the battery to the heat sink.

Preferably, the liquid is mercury pressurised to substantially $1.034 \times 10^5$ Nm$^2$ which will boil at substantially 350° C.

Preferably, the thermal shunt is arranged on the upper surface of the battery.

Preferred embodiments of the present invention will now be described in detail, by way of example only, with reference to the accompanying drawings of which:

FIG. 1 is a schematic sectional view of a battery provided with a thermal shunt according to a first embodiment of the present invention;

FIG. 2 is a view in direction II—I1 of the arrangement in FIG. 1;

FIG. 3 is an enlarged view of one of the bellows connections in FIG. 1;

Figure 4:
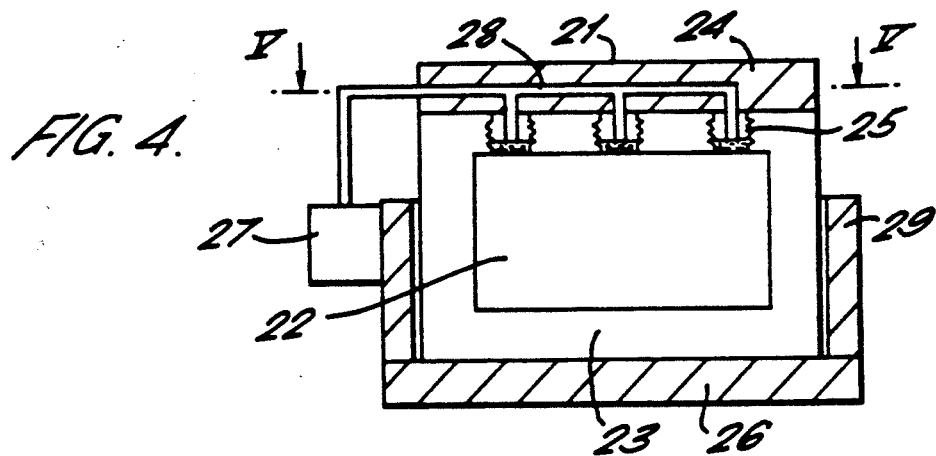
FIG. 4 is a schematic sectional view of a battery provided with a thermal shunt according to a second embodiment of the present invention.

The first preferred embodiment of the present invention is depicted in FIGS. 1 to 3. The thermal shunt, generally indicated by reference numeral 1, is connected to a battery 2 in a thermally-insulating container or box 3. The thermal shunt 1 comprises an external heat sink 4 and bellows 5 connected between the heat sink 4 through the container 3 to the battery 2. The bellows 5 are supplied with a thermally conductive liquid which is delivered from a reservoir 6 via a pump 7 through a distribution manifold 8. The centre bellows 5 is supplied with the liquid before the others which surround it. The complete arrangement is surrounded by a pannier 9. In FIG. 2 the distribution manifold 8 can be clearly seen.

FIG. 3 is an enlarged view of one of the bellows 5 in FIG. 1. In the arrangement of FIGS. 1 to 3 the thermal shunt is located on the lower surface of the battery 2, the liquid supply being such that liquid 10 rises in the bellows 5 eventually making thermal contact between the heat sink 4 and battery 2. There is a collection point 14 for gas trapped in the bellows 5 before the liquid 10 is pumped into the arrangement. In this figure the inner 11 and outer 12 containers for the battery 2 can be seen—the thermally-insulating container 3 is located between containers 11 and 12. The end cap 13 of the bellows 5 is bolted to the heat sink 4 by bolt 16 which then provides a good thermal contact between the heat sink 4 and liquid 10.

In use, the arrangement is provided with a switching mechanism (not shown) which is switched on when the battery 2 reaches a predetermined temperature of approximately 350° C. The reservoir will then release liquid which is pumped by pump 7 into the distribution manifold 8. Each of the bellows 5 is then supplied with liquid 10 which fills the bellows 5 and eventually makes thermal contact with the lower surface of the battery via heater plate 15. There will then be thermal contact between the battery 2 and heat sink 4 so that heat will be conducted through the battery box 3 via the liquid 10, end cap 13 and bolt 16 to the heat sink 4. When the temperature of the battery 2 falls sufficiently the liquid supply will be cut off and the level of liquid 10 in bellows 5 will fall until thermal contact is broken.

Figure 5:
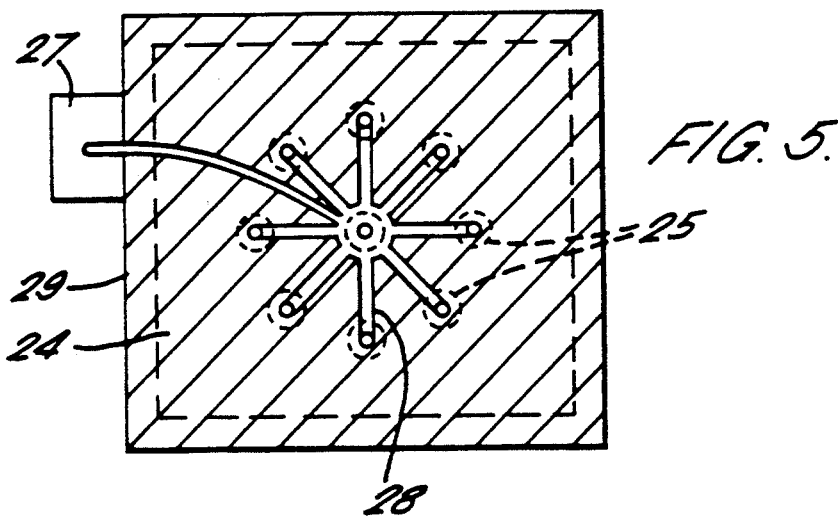
FIG. 5 is a view in direction V—V of the arrangement in FIG. 4.
Figure 6:
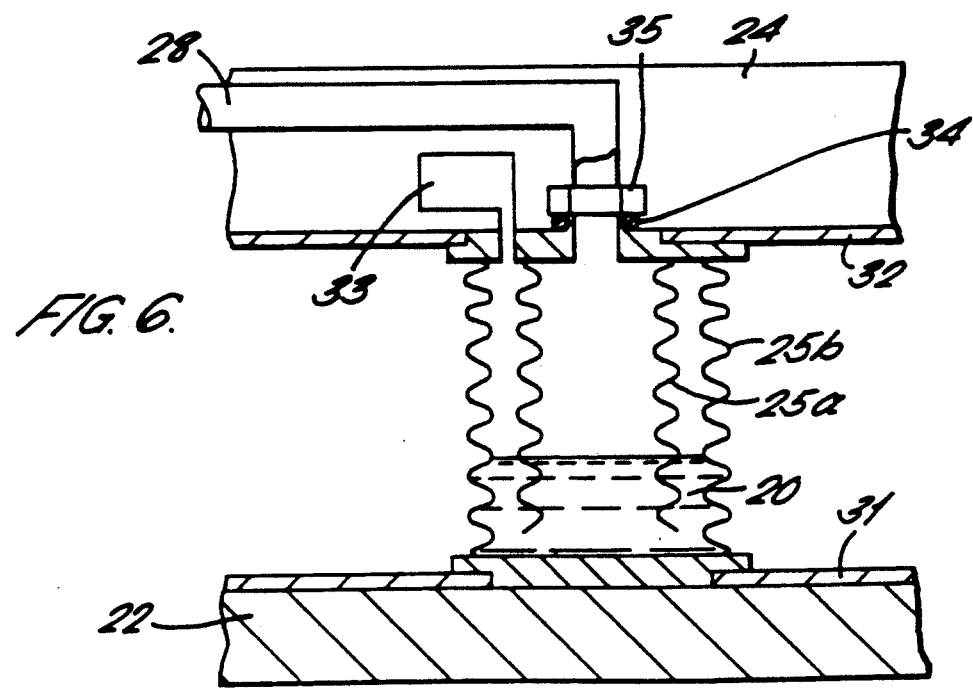
FIG. 6 is an enlarged view of one of the bellows connections in FIG. 4.

The second embodiment of the present invention is depicted in FIGS. 4 to 6. The thermal shunt, generally indicated by reference numeral 21 is connected to a battery 22 in a thermally-insulating container or box 23. The thermal shunt 21 comprises an external heat sink 24 and bellows 25 connected between the heat sink 24 through the container 23 to the battery 22. The bellows 25 comprise inner 25a and outer 25b bellows (see FIG. 6) and contain a predetermined level of thermally conductive liquid 20. A gas pump 27 delivers a gas via a distribution manifold 28 to each of the bellows 25. FIG. 5 is a sectional view of the arrangement taken in direction V—V in FIG. 4 and it can be seen that the distribution manifold 28 supplies nine bellows 25, the centre bellows being supplied before the others which surround it. The complete arrangement is surrounded by a pannier 29 and rests on battery support cross members 26 which may form the base of the pannier 29.

FIG. 6 is an enlarged view of one of the bellows 25 in FIG. 4. In the arrangement of FIGS. 4 to 6 the thermal shunt is located on the upper surface of the battery 22. The bellows 25 each contain sufficient thermally-conductive liquid 20 such that when the gas is supplied to the inner bellows 25a the liquid 20 can rise in the volume between the inner 25a and outer 25b bellows to make thermal contact between the battery 22 and heat sink 24. There is a collection point 33 for gas trapped in the bellows before the gas is pumped into the arrangement. The inner and outer containers 31 and 32 for the battery 22 can be seen in FIG. 6 and nut 35 and O-ring 34 which serve to seal the air distribution manifold 28 to the bellows 25.

In use, the arrangement is provided with a switching mechanism (not shown) which is switched on when the battery 22 reaches a predetermined temperature of approximately 350° C. The pump 27 will then be activated and gas will be pumped via the distribution manifold 28 to each of the bellows 25. The gas supplied to the bellows 25 will force the liquid 20 to rise and make a thermal contact between the battery 22 and heat sink 24. Heat will then be conducted away from the battery 22 until the temperature falls sufficiently to switch off the gas pump 27 which in turn will break the thermal contact between battery 22 and heat sink 24.

Figure 7:
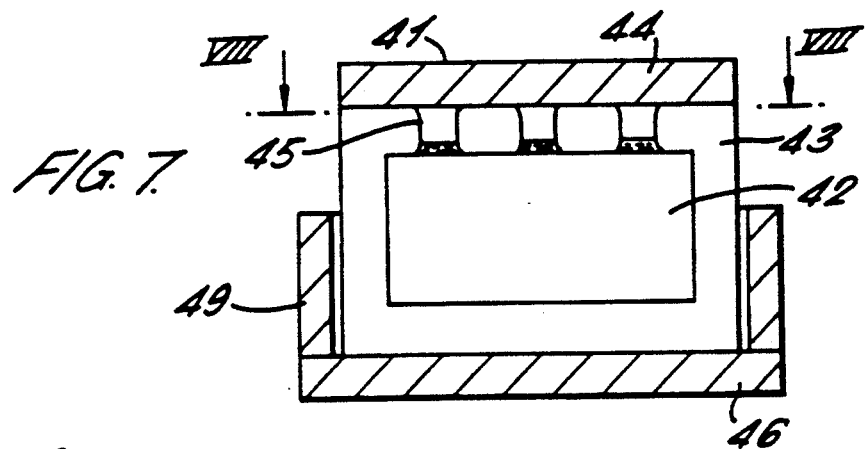
FIG. 7 is a schematic sectional view of a battery provided with a thermal shunt according to a third preferred embodiment of the present invention.
Figure 8:
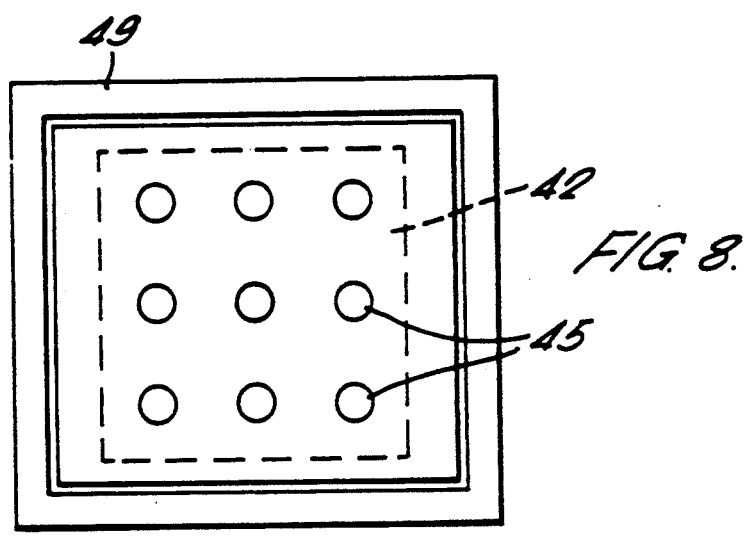
FIG. 8 is a view taken in direction VIII—VIII in FIG. 7.
Figure 9:
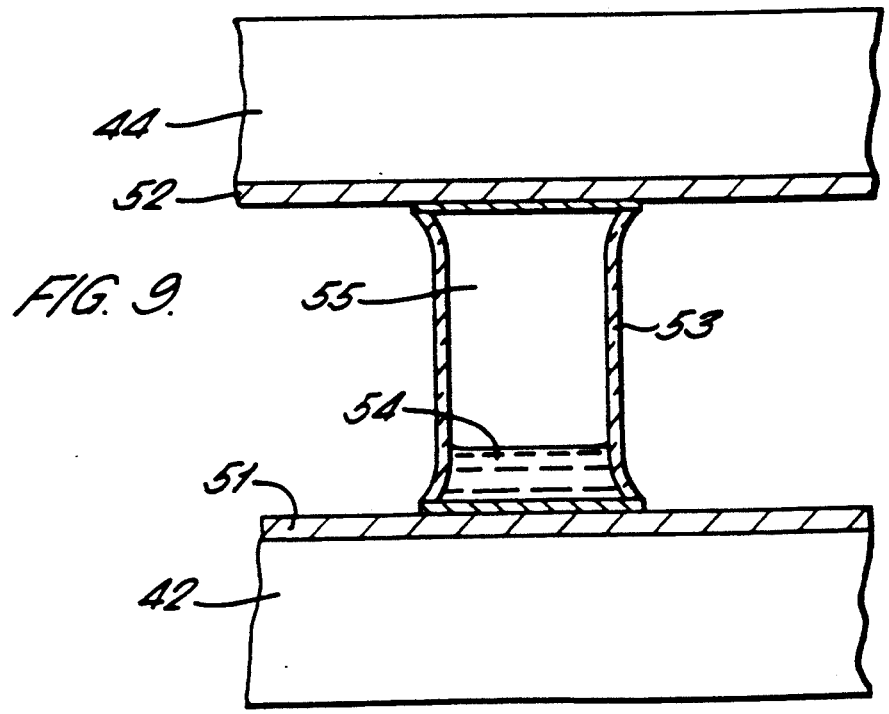
FIG. 9 is an enlarged view of one of the containers in FIG. 7.

The third embodiment of the present invention is depicted in FIGS. 7 to 9. The thermal shunt, generally indicated by reference numeral 41 is connected to a battery 42 in a thermally-insulating container or box 43. The thermal shunt 41 comprises an external heat sink 44 and several pressurised mercury containers 45 connected between the heat sink 44 through the container 43 to the battery 42. The pressurised mercury containers 45 typically contain mercury 54 which is pressurised to $1.034 \times 10^5$ Nm$^2$. Since the boiling point of mercury is a function of pressure, the pressure in volume 55 above the mercury 54 can be adjusted such that the mercury will boil at approximately 350° C. which is the upper temperature of operation for the battery. At $1.034 \times 10^5$ Nm$^2$ the mercury boils at 350° C. and vapour will rise in the container 53 and condense on the cooler upper surface which is in contact with the heat sink 44 via outer container 52. The container 53 need only have conductive upper and lower surfaces for heat conduction to occur from the battery 42 to the heat sink 44. The walls of the container 53 could, therefore, be made from a thermally insulating material such as a ceramic, for example.

In use, the arrangement is located on the upper surface of battery 42 such that the mercury 54 is in thermal contact with the battery via inner container 51 and the mercury container 53. When the temperature of the battery rises to 350° C. the mercury 54 will boil, release vapour which then gives up its latent heat when it condenses on the cooler upper surface of the container 53. Heat conduction will continue in this way until the temperature of the battery falls sufficiently and the mercury is below its boiling point. Below the boiling point of the mercury there is negligible heat conduction. The complete arrangement is surrounded by a pannier 49 and rests on battery support cross members 46 which may form the base of the pannier 49.

We claim:

1. A battery arrangement comprising:
   a thermally insulating container;
   a battery having a battery surface with one or more selected points, the battery being contained within the thermally insulated container; and
   a thermal shunt, the thermal shunt including
      an external heat sink,
      one or more containers for holding a thermally conductive fluid, the one or more containers connecting respective ones of the one or more selected points on the battery surface and the external heat sink,
      a pump arranged to supply a pump fluid to the one or more containers to urge the thermally conductive fluid to make thermal contact between the one or more selected points on the battery surface and the external heat sink, and
      temperature responsive means for actuating the pump.

2. A battery arrangement as claimed in claim 1 wherein the pump fluid includes the thermally conductive fluid.

3. A battery arrangement as claimed in claim 2 wherein the one or more containers are bellows.

4. A battery arrangement as claimed in any one of claims 2, 3, and 1 wherein the battery surface is a lower surface of the battery.

5. A battery arrangement as claimed in claim 1 wherein the pump fluid is any one of a pressurized gas and vapor.

6. A battery arrangement as claimed in claim 5 in which the one or more containers are provided as concentric bellows arrangements having inner and outer bellows, the gas or vapor being delivered to the bellows arrangements to urge the thermally conductive fluid to make thermal contact between the one or more selected points on the battery surface and the external heat sink.

7. A battery arrangement as claimed in claim 6 wherein the gas or vapor is delivered to the inner bellows and the thermally conductive fluid is urged between the inner and outer bellows to make thermal contact between the one or more selected points on the battery surface and the external heat sink.

8. A battery arrangement as claimed in any one of claims 5-7 wherein the battery surface is an upper surface of the battery.

* * * * *